May 8, 1962

C. A. HISSERICH 3,033,050

MOTION TRANSMISSION SYSTEM

Filed Sept. 10, 1959

INVENTOR
CHARLES A. HISSERICH,

BY Stevens, Davis, Miller + Mosher

ATTORNEYS

May 8, 1962 C. A. HISSERICH 3,033,050
MOTION TRANSMISSION SYSTEM
Filed Sept. 10, 1959 3 Sheets-Sheet 2
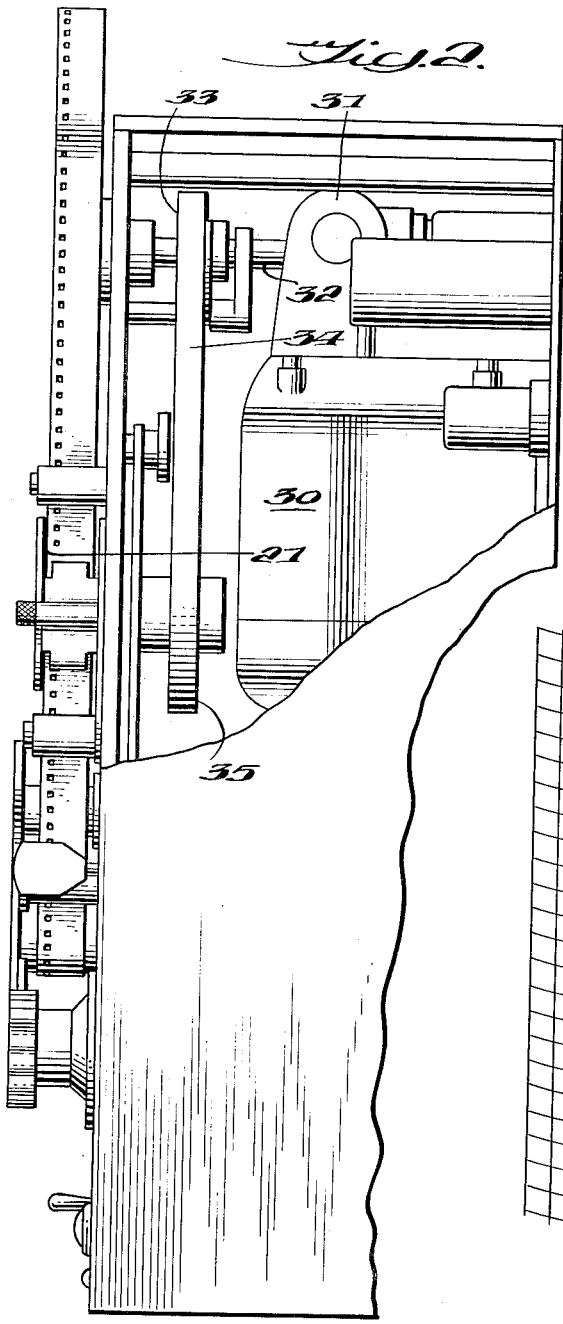
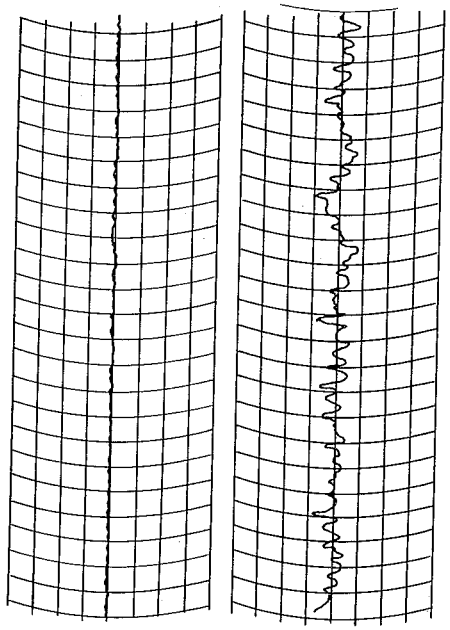
INVENTOR
CHARLES A. HISSERICH,
BY Stevens, Davis, Miller & Mosher
ATTORNEYS May 8, 1962   C. A. HISSERICH   3,033,050
MOTION TRANSMISSION SYSTEM
Filed Sept. 10, 1959   3 Sheets-Sheet 3
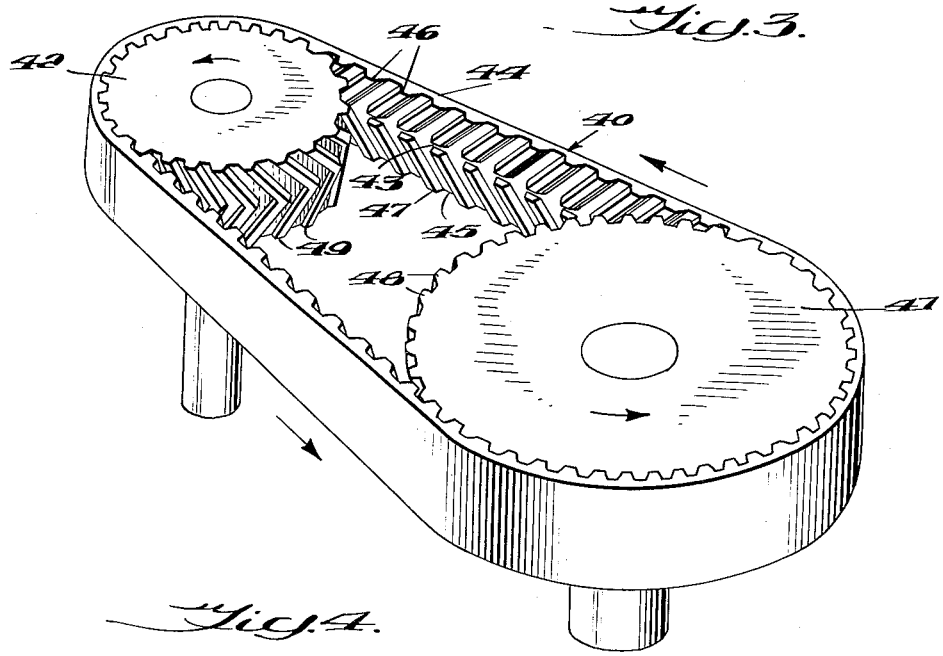
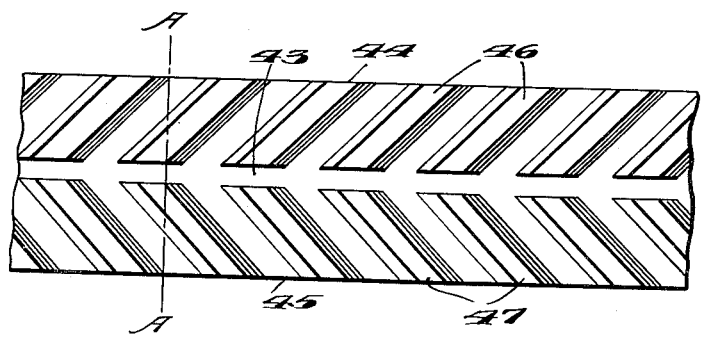
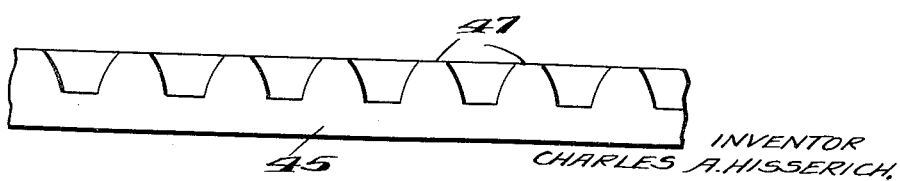
INVENTOR
CHARLES A. HISSERICH,
BY Stevens, Davis, Miller & Mosher
ATTORNEYS

United States Patent Office

3,033,050
Patented May 8, 1962

3,033,050
MOTION TRANSMISSION SYSTEM
Charles A. Hisserich, 1001 Carolina Ave., Melrose Park, Fort Lauderdale, Fla.
Filed Sept. 10, 1959, Ser. No. 839,168
4 Claims. (Cl. 74—229)

This invention relates generally to transmission belt systems and more particularly to an improved non-slip timing belt system and is a continuation-in-part of my co-pending application, Serial Number 593,988, filed on June 26, 1956, now abandoned.

Many automatic control systems, particularly data recording instruments, require the use of accurate transmission belts for driving one pulley or gear by another pulley or gear at a remote location. Endless transmission belts are known which have teeth formed thereon to engage gears or pulleys to provide for the transmission of power without slippage and when large amounts of power are required to be transmitted, gears and toothed belts with reinforcing members are employed to prevent longitudinal stretch. Such belts are quite effective to transmit large amounts of power and even with "belt slap" are more quiet than other power drives, such as gear boxes or gear chains.

In order to prevent axial slippage of the toothed belts, however, it is usually necessary to provide side flanges on the gears. With the use of such flanges, the belts have a tendency to climb on one side or the other of the flange and much energy in driving the belt is lost as a result of this frictional engagement. This frictional loss considerably shortens the life of the belt. But more important, the tendency for the belt to climb the side flanges results in flutter or uneven rotation of one of the gears.

Some automatic control systems and data recording instruments record information such as in multiple channel telemetering systems, by the use of FM channels and subchannels, in order to increase the number of data channels available in the system. In the recording of data by a FM carrier, a considerable degree of uniformity of motion transmission must be maintained. In other words, the "motion quality" must be such that the frequency modulated signals will be faithfully recorded on a data storage member and faithfully reproduced therefrom. The recording of this information places such extremely severe requirements on the "motion quality" of the recorder that this factor becomes one of the major limitations in such a system.

This point may not be immediately evident unless the full implication of the term "frequency modulation," or FM, as applied to data recording is appreciated. This technique may be simply described by stating that the significant information in FM telemetry is contained in the exact frequency, not in the amplitude of this frequency, as is normal in AM or amplitude modulated systems. At first glance, it would appear that a one percent deviation of motion becomes a one percent deviation in frequency, with a constant one percent error in the stored information. This is true; however, there is a much more serious possibility. If the deviation occurs at a rate, say, of 30 or 40 cycles per second, the interpretation of the results may lead to the erroneous inference that a small 30 cycle flutter was occurring in the performance of the structure under consideration, as, for example, a wing of an airborne vehicle, if it were being studied by strain gauge telemetry, whereas the actual signal was caused by the flutter in the recording mechanism. If this error is repeated in the reproduction of the information recorded, the error may vary statistically between zero and two percent, depending upon the nature of the asynchronism in the recording machine, and lead to the further implication that the supposed flutter was transient in occurrence. In such equipment, one would not know whether the signal represented performance of equipment, information on which was telemetered to a recorder, or a signal introduced by the recorder.

The term "indexing" is sometimes used to describe the motion of the driving and driven shafts, and by this is meant, that the angular motion of the driving shaft is transmitted to the driven shaft so that at each instance the motion is the same, affected only by the pulley or gear ratio, and that motion of the first shaft produces the exact and corresponding motion of the second shaft.

It should be understood that in belt transmission systems of the type with which this invention is concerned, it is not usual to transmit large amounts of power. The belts of the invention are concerned only with sufficient power loads to actuate drive systems such as are employed in data recording systems of telemetering equipment. A further point that should be made clear is that a belt transmission system satisfactory for transmitting motion, should be free from flutter, which is vibration in the belt system which may be due to slight deviations in the gear teeth or "belt slap" occasioned by the belt tooth disengaging a tooth on the gear across its face at one time, rather than a progressive disengagement of the belt tooth from the gear tooth.

Other applications where the transmission system of this invention can be used in addition to the above mentioned are velocity servo systems, optical tracking, function generators in computers, all of which are examples of a high degree of uniform rotational velocity.

Bearing the above in mind, a primary object of the present invention is to provide an improved timing belt system in which proper indexing between rotating gears or pulleys is maintained without any sidewise or axial slipping whereby the provision of flanges or rims is avoided.

More particularly, an object of the invention is to provide an endless transmission belt system in which energy dissipation as a result of frictional losses incurred by axial slippage are minimized whereby power is transmitted more efficiently and the operating life of the belt is increased.

Another object is to provide a transmission timing belt system which readily accommodates tooth errors in the driving or driven gears.

Another object of the invention is the provision of a non-slipping indexing belt of sufficient resilience so that tooth error will be integrated over all the belt teeth engaged.

A further object is the provision of structure in a belt system whereby flutter and belt slap is precluded by the gradual disengagement of the belt from the tooth along the pitch line or any other line of the tooth.

These and other objects and advantages of this invention are attained by providing a transmission system including a driving gear and a driven gear and an endless transmission belt coupling the gears for transmitting motion of the driving gear to the driven gear. Both the driving and driven gears are provided with gear teeth arranged in a pattern to form an endless series of V-shaped teeth. The vertices of these teeth lie on a circumferential line about the gear periphery midway between the peripheral edges. The transmission belt is provided with a series of herringbone-shaped teeth dimensioned to mesh with the V-shaped gear teeth whereby the belt teeth and the gear teeth are in a type of engagement tending to exert pressure such that the belt automatically maintains itself centered on each of the gears. The herringbone-shaped teeth on the belt are spaced such that the imaginary vertex, formed by extending the herringbone-shape, of one of the teeth extends beyond a transverse line connecting the outer or edge ends of the next adjacent herringbone-shaped tooth whereby an overlapping of the herringbone-shapes results and insures a continuous centering action. The gears may be run in either direction with the improved performance over the above described systems.

A better understanding of the invention will be had by referring to the accompanying drawings in which:

FIGURE 2 is a side perspective view, broken away to show the belt transmission system;

FIGURE 3 is a perspective view illustrating the endless transmission belt system of the present invention;

FIGURE 4 is an enlarged plan view of the belt of the system, showing the arrangement of teeth on the belt;

FIGURE 5 is an edge elevation of the belt of FIGURE 4; and

FIGURES 6a and 6b illustrate charts showing examples of flutter.

Figure 1:
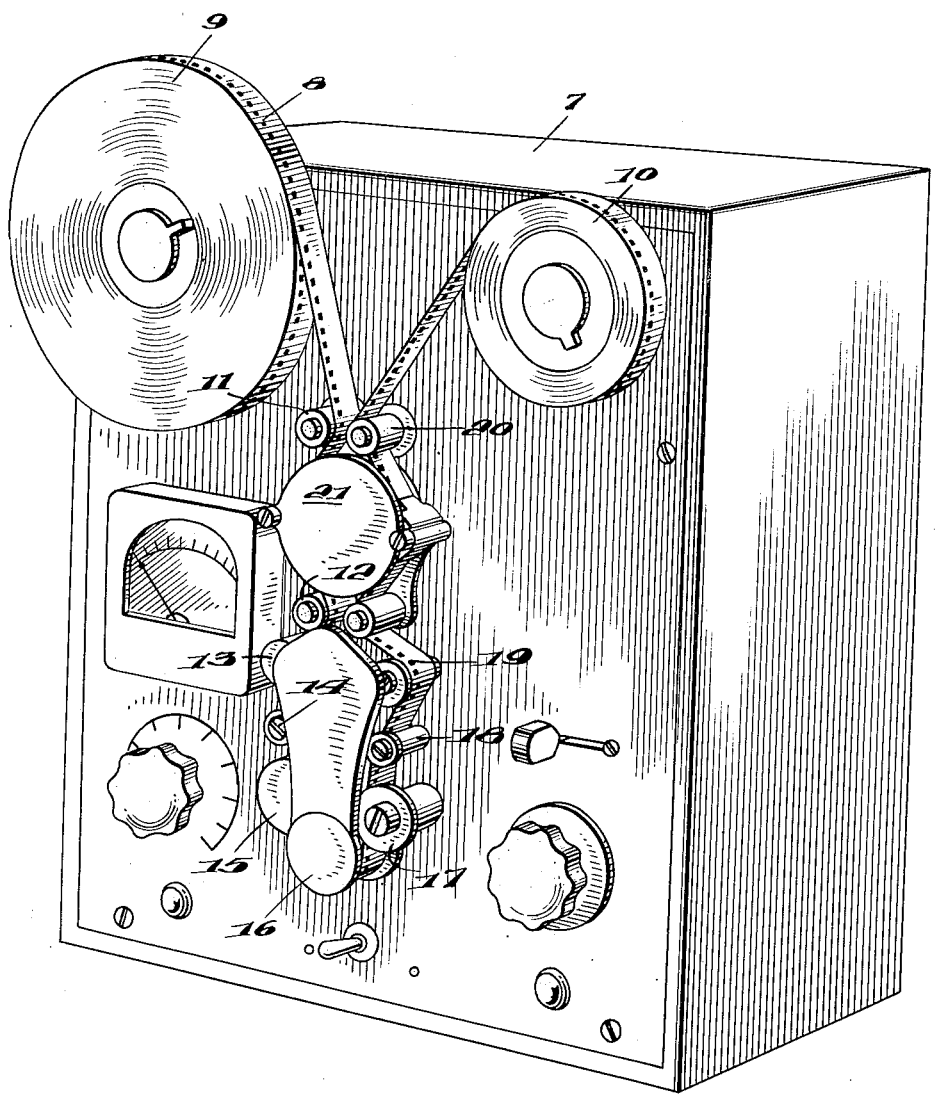
FIGURE 1 is a perspective view of a recorder such as might be used in a telemetering system.

The equipment illustrated in FIGURE 1 is typical of recording equipment such as might be employed to record frequency modulated signals in a telemetering system which is only one of the applications mentioned above. The housing 7 has mounted on its exterior, recording tape 8 on reels 9 and 10. The tape is fed over guides 11, 12, 13, 14, 16, and under recording and readout head 15, over guides 17, 18, 19 and 20. A drive sprocket housed in 21 moves the recording tape 8 from reel 9 to reel 10 with a predetermined motion past head 15 for recording and read-out.

In FIGURE 2, there is shown in a side sectional view, a synchronous motor 30, gear box 31 and drive shaft 32 for a drive gear 33, and belt 34 over gear 35. Gear 35 is directly connected to drive sprocket 21 on the other side of the panel of the housing 7. Such a recorder will receive telemetering signals, that is, FM signals, from instrumented airborne or space vehicle, indicative of performance of components, such as load, thrust, fuel consumption, etc. The FM signals will be recorded on tape 8. The tape is passed under the recording head 15 at a predetermined speed. To read-out these signals and the data recorded thereby, at a later date, the tape 8 is again fed through the machine with the recording head 15 acting as a reading head and the motion of the tape reproduced for read-out as it was when the information was recorded. This means that the constant speed motor 30 must continue to turn shaft 32 the same revolutions per minute on reading, as it did on recording the information. The motion of this shaft is transmitted through belt 34 to gear 35 and sprocket drive 21. There will be no noise or vibration introduced from the motor and gear box because of the flexible resilient belt transmission system, and accordingly, there will be no unwanted frequency superposed upon the recorded frequency by the machine in the belt transmission system hereinafter described.

In FIGURE 3 the transmission system is shown as comprising an endless transmission belt 40 extending from a driving gear 41 to a driven gear 42 and thence back around the driving gear. The teeth on the belt 40 are arranged in a series of two rows defining a central longitudinal channel 43 substantially midway between the longitudinal edges 44 and 45 of the belt. Each of the teeth in the respective rows is angulated with respect to the adjacent edge and central channel 43 such that they converge to form general herringbone-shapes. The spacing between the teeth in each row at the pitch line is substantially equal to the thickness of each of the teeth at the pitch line. The projected vertices of the herringbone-shapes lie on a line passing centrally along the channel 43 substantially midway between the longitudinal edges 44 and 45, while the free ends of each of the herringbone-shapes terminate on the edges 44 and 45 respectively.

Referring now to FIGURES 4 and 5, it will be noted that the teeth 46 in one row are each parallel to each other and angulated with respect to the longitudinal edge 44. The teeth 47 in the other row are also parallel to each other and angulated with respect to the lower longitudinal edge 45 but in such a direction as to converge with respect to the corresponding teeth 46 to provide the referred to herringbone configuration. The spacing of the angulated teeth in each of the rows is such that the inner converging ends of the various herringbone-shapes overlap. For example, these ends extend beyond a transverse line A—A in FIGURE 4 connecting the free ends of the next adjacent herringbone-shaped tooth.

It will be noted that as the belt separates from the gear, due to the overlap of the teeth as illustrated by the transverse line A—A, the belt teeth will not disengage the pitch line of the tooth or the tooth face at one time but will, rather disengage gradually or peel off the gear tooth. This precludes "belt slap" which occurs when the whole belt tooth snaps free of the cavity in the gear, and also prevents flutter in the free, unsupported portion of the belt.

Referring once again to FIGURE 3, it will be noted that each of the gears 41 and 42 are provided with a pattern of V-shaped teeth 48 and 49 dimensioned to mesh with the herringbone-shaped teeth on the belt 40. The vertices of the various V-shapes on each of the gears, such as the gear 42, for example, lie on a circumferential line passing about the gear 42 substantially midway between the peripheral edges thereof.

Preferably the belt 40 is constructed of a flexible rubbery or resilient material of high durometer, such as neoprene, whereby the individual teeth may flex slightly to accommodate any tooth error in the rigid teeth 48 and 49 of gears 41 and 42. Further, the use of such material insures quiet operation.

The graphs shown in FIGURES 6a and 6b are typical of flutter that may be expected in the conventional drive (FIGURE 6b) and a drive in accordance with this invention (FIGURE 6a). Theoretically, no signal should produce a trace on the median line of the graph without deviation therefrom, which would mean that the driven system corresponded exactly in a one-to-one or some other ratio with the driving system, with no extraneous frequencies introduced by reason of transmission of motion from one to the other. FIGURE 6b illustrates, on a 0 to 2% graph, that with the best system previously available, a .5% peak flutter is quite common, whereas with the transmission system of this invention a trace representative of the flutter condition, with a peak of .1% or less, can be expected.

In operation, the herringbone-shaped teeth on the belt cooperate with the gear teeth to tend towards establishing a condition of force balance centering the belt on the gears. Thus, if the belt shifts towards the lower side of the gears, a portion of the load is removed from that side and an additional pull is exerted on the upper side. This additional pull results in an increased axial force towards the upper side in a direction tending to re-center the belt. By this arrangement, the associated gears may be constructed without any restraining rims or flanges. Because of the overlap of the herringbone-shapes on the belt as described in connection with FIGURE 4, this centering action takes place continuously, and the belt teeth are peeled from the gear teeth without flutter or vibration.

It will thus be seen that the present invention provides a transmission belt which will transmit rotational motion over the same ratios normally encountered in direct gear drives. Any error in the gear is integrated over all the teeth engaged, resulting in an accuracy not heretofore attainable in conventional type belt drives. The herringbone-shaped construction renders the belt equally effective for driving one of the gears in either direction, the unique engagement affords the advantages set forth above.

Minor modifications within the scope and spirit of the present invention will occur to those skilled in the art. The transmission belt system of this invention, therefore, is not to be thought of as limited to the specific embodiment chosen for illustrative purposes.

I claim:
1. A transmission system including: a driving gear and a driven gear; an endless transmission belt passing around said driving gear and said driven gear for transmitting motion of said driving gear to said driven gear; a series of V-shaped gear teeth on said gears, the vertices thereof lying on a circumferential line about said gears midway between the peripheral edges thereof; a series of belt teeth integrally formed on said transmission belt, said belt teeth being arranged in a herringbone pattern, the angle of the individual belt teeth in said herringbone pattern corresponding to the angle formed by the said V-shape of the gear teeth, and the inner ends of said individual belt teeth terminating short of a central longitudinal line on said belt to define a central channel between said teeth, the longitudinal spacing between the teeth in said herringbone pattern being such that the individual herringbone shapes making up said pattern overlap, whereby one individual herringbone-shaped belt tooth engages a corresponding V-shaped gear tooth prior to the disengagement of the immediately preceding herringbone-shaped belt tooth by said same V-shaped gear tooth.

2. An endless transmission belt system for transmitting motion between at least two gears, said gears having V-shaped teeth, said belt having on its inner surface first and second rows of teeth in side by side relationship extending longitudinally of the belt, the width of each row occupying less than one half the width of said belt to leave a centrally disposed longitudinal channel on said inside surface, each of the teeth in said first row being parallel to each other and angulated with respect to one longitudinal edge of said belt, each of the teeth in said second row being parallel to each other and angulated in a direction to converge with corresponding teeth in said first row whereby each tooth in one row forms one side of a herringbone-shape with its adjacent corresponding tooth in the other row, the degree of angulation of said teeth and the spacing between said teeth being such that each herringbone shape overlaps the next adjacent herringbone-shape, said respective rows of teeth providing progressive incremental disengagement of the teeth and an inward centering force component directed towards said central channel when said belt is in driving engagement with said V-shaped teeth on said gears.

3. A transmission system including: a driving gear and a driven gear; an endless transmission belt passing around said driving gear and said driven gear for transmitting motion of said driving gear to said driven gear; a series of V-shaped gear teeth on said gears, the vertices thereof lying on a circumferential line about said gears midway between the peripheral edges thereof; a series of belt teeth integrally formed on said transmission belt, said belt teeth being arranged in two rows along the edges of said belt in a herringbone pattern, the angle of the individual belt teeth in said herringbone pattern corresponding to the angle formed by the said V-shape of the gear teeth, and the inner ends of said individual belt teeth terminating short of a central longitudinal line on said belt to define a central channel between said teeth, the longitudinal spacing between the teeth in said herringbone pattern being such that the individual herringbone-shapes making up said pattern overlap, whereby one individual herringbone-shaped belt tooth engages a corresponding V-shaped gear tooth prior to the disengagement of the immediately preceding herringbone-shaped belt tooth by said same V-shaped gear tooth.

4. A transmission belt system having driving and driven gears, each of said gears having a series of symmetrical V-shaped gear teeth, a belt extending around and engaging the peripheries of said gears, said belt having on its inner surface, first and second rows of teeth in side by side relationship, the width of each row occupying less than one half the width of said belt to leave a centrally disposed longitudinal channel on said inside surface, the spacing between adjacent teeth in each row at substantially half the projecting distance of the teeth being substantially equal to the thickness of each of said teeth at substantially half said projecting distance, each of the teeth in said first row being parallel to each other and angulated with respect to one longitudinal edge of said belt, each of the teeth in said second row being parallel to each other and angulated in a direction to converge with corresponding teeth in said first row whereby each tooth in one row forms one side of a herringbone-shape with its adjacent corresponding tooth in the other row.

References Cited in the file of this patent
UNITED STATES PATENTS

| | | |
|---|---|---|
| 1,179,999 | Blevney | Apr. 18, 1916 |
| 1,994,604 | Bohne | Mar. 19, 1935 |
| 2,091,958 | Braga | Sept. 7, 1937 |
| 2,815,671 | Talipsky et al. | Dec. 10, 1957 |